Aug. 31, 1965

G. A. KLATCHKO 3,203,231

MATERIALS TESTING MACHINE

Filed Feb. 6, 1963

INVENTOR.
GEORGE A. KLATCHKO
BY
ATTORNEY

Aug. 31, 1965
G. A. KLATCHKO
3,203,231
MATERIALS TESTING MACHINE
Filed Feb. 6, 1963
3 Sheets-Sheet 2
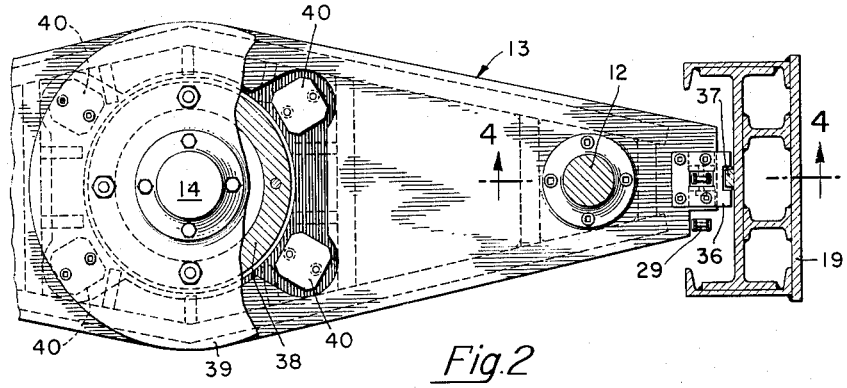
Fig. 2
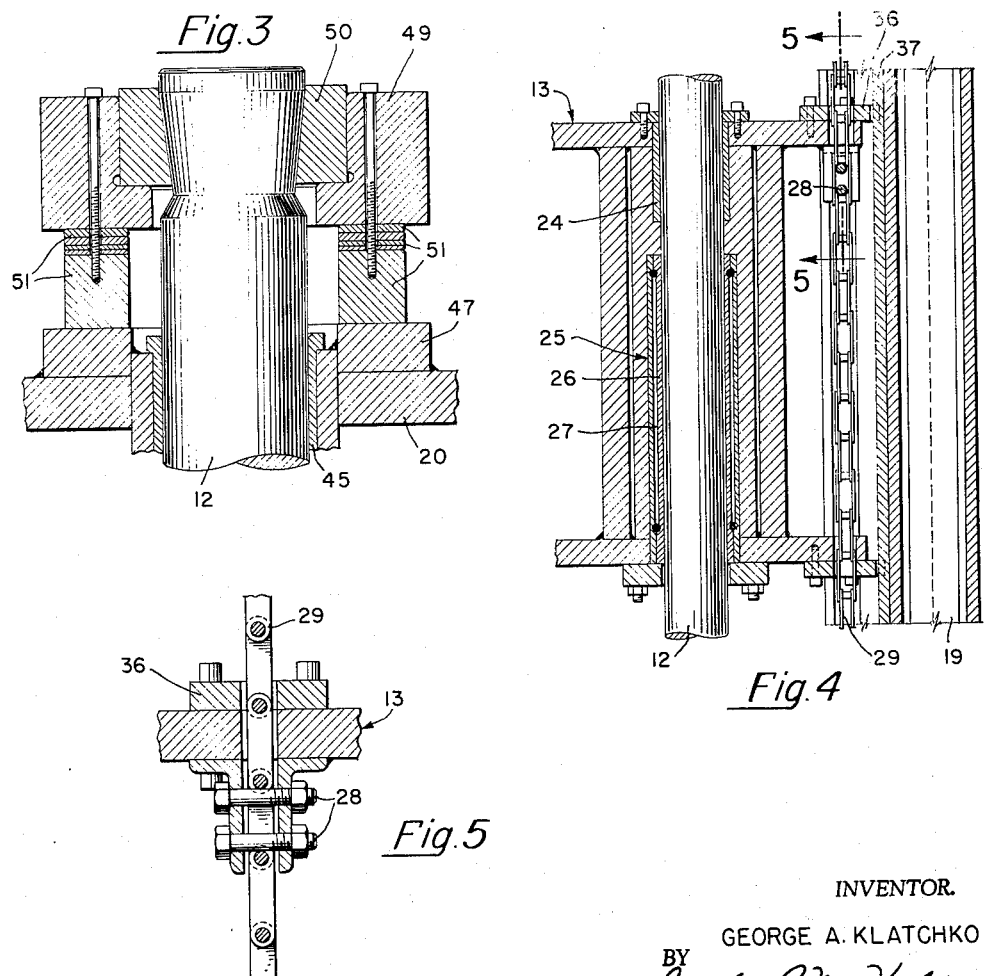
Fig. 3
Fig. 4
Fig. 5
INVENTOR.
GEORGE A. KLATCHKO
BY
Douglas R. McKechnie
ATTORNEY Aug. 31, 1965        G. A. KLATCHKO        3,203,231
MATERIALS TESTING MACHINE
Filed Feb. 6, 1963        3 Sheets-Sheet 3

INVENTOR.
GEORGE A. KLATCHKO
BY
ATTORNEY

United States Patent Office 3,203,231
Patented Aug. 31, 1965

3,203,231
MATERIALS TESTING MACHINE
George A. Klatchko, Levittown, Pa., assignor, by mesne assignments, to Tinius Olsen Testing Machine Co., Willow Grove, Pa., a corporation of Pennsylvania
Filed Feb. 6, 1963, Ser. No. 256,684
3 Claims. (Cl. 73—93)

This invention relates to a machine for testing materials in tension and compression and, more particularly, to the support structure and loading mechanism of such a machine.

One of the objects of the invention is to provide a novel materials testing machine adapted to test parts and materials in tension and compression.

Another object is to provide a testing machine wherein the test specimen is mounted in the same place for both tension and compression tests.

Still another object is to provide a testing machine wherein the rated test load is the same for both tension and compression testing.

Another object is to provide a testing machine wherein the load columns are mounted in such a manner as to preclude the application thereto of compressive forces due to the application of a testing load.

Other objects and advantages of the invention will be apparent from the following description taken in connection with the accompanying drawings wherein:

FIG. 2 is a top plan view, partly in section and with portions removed, along lines 2—2 of FIG. 1;

Figure 1:
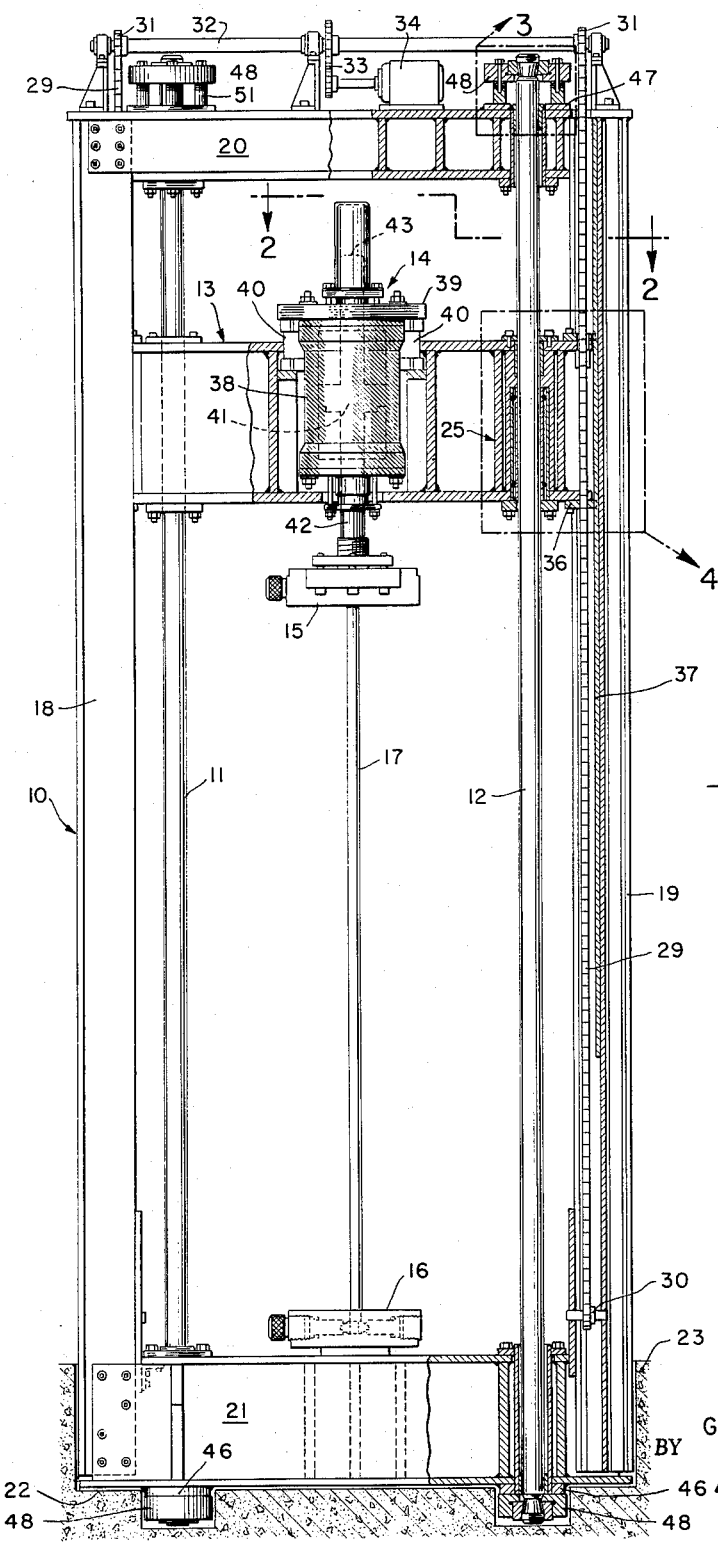
FIG. 1 is a front elevational view, partly in section and with portions removed, of a testing machine embodying the invention.
Figure 6:
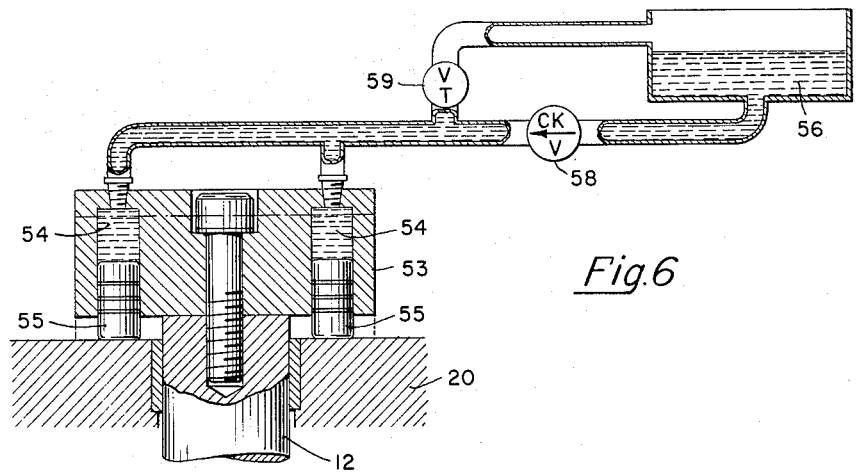
Figure 7:
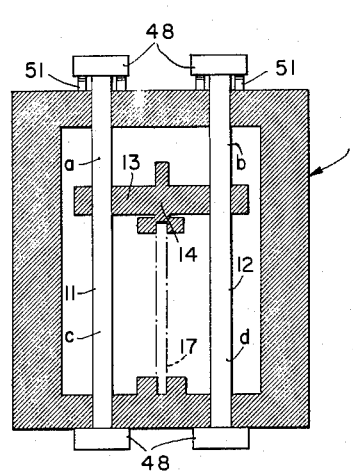

FIGS. 3 and 4 are enlarged views of details enclosed in reference boxes 3 and 4 respectively of FIG. 1;

FIG. 5 is a vertical sectional view along lines 5—5 of FIG. 4;

FIG. 6 is an enlarged detail view of a modification of the invention;

FIG. 7 is a schematic view of the embodiment shown in FIGS. 1–5; and

Figure 8:
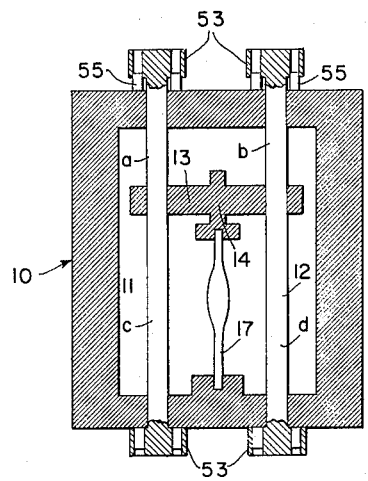
Figure 9:
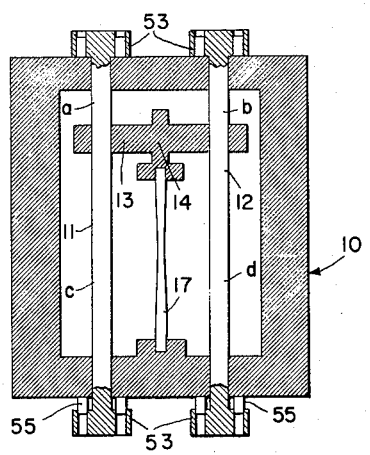

FIGS. 8 and 9 are schematic views similar to FIG. 7 of a testing machine modified in accordance with the invention as illustrated in FIG. 6.

Referring now to the drawings, there is shown in FIG. 1 a testing machine comprising a vertical, rectangular support frame 10, a pair of parallel, upright load columns 11 and 12, a crosshead 13, a loading unit 14 mounted on the crosshead, and a pair of vertically spaced test specimen grippers 15 and 16 adapted to support a test specimen 17 for the application of a testing load thereto.

Support frame 10 comprises a pair of upright, laterally spaced, parallel side members 18 and 19 connected at their upper ends to a horizontal yoke member 20 and at their lower ends to a horizontal base member 21 mounted in the pit 22 of a suitable foundation 23 which supports the testing machine. The support frame is preferably anchored or reinforced against lateral movements by suitable structural members (not shown) so as to prevent the testing machine from toppling over should excessive lateral forces be applied thereto. The base and yoke members are fabricated from welded steel plates whereas the side members are primarily fabricated from rolled structural members of common sections.

Crosshead 13 extends between the side members and includes a pair of hydraulically operated column locks 25 each of which, as shown in FIG. 4, comprises a metal sleeve surrounding the associated column, and a sealed, annular chamber 27 adapted to receive a highly pressurized fluid that causes the sleeve to tightly and frictionally grip the column and lock the crosshead at the desired height. Crosshead 13 is movable along the columns between different vertical positions in order to accommodate test specimens of different lengths in the testing machine and the testing machine includes means for accomplishing such movement. Crosshead 13 includes a pair of bearings 24 each located above one of the column locks and slidably engaging the associated column for guiding movement of the crosshead along the columns. The means for moving the crosshead includes a pair of endless chains 29 which are bolted by bolts 28 to the crosshead 13 and which pass over idler sprockets 30 and driving sprockets 31 carried on the ends of a shaft 32 supported on top of yoke 20. The shaft 32 is suitably connected by some form of a gear train 33 to a reversible electric motor 34 which, upon rotation thereof, moves chains 29. To vary the position of crosshead 13, column locks 25 are released and the motor 34 is driven or operated in the appropriate direction to drive chains 29 and raise or lower the crosshead to the desired height. Thereafter, column locks 25 are energized to frictionally lock the crosshead and columns. When thus locked, the crosshead is supported by the columns whereas during raising and lowering, the crosshead is supported on chains 29 and yoke 20. Although the connection between motor 34 and shaft 32 is shown simply as a pair of gears, it is preferable that the connection include a heavy gear reducer and a fail-safe type brake.

The ends of crosshead 13 carry guide bracket 36 which straddle a pair of guide rails 37 mounted on side members 18 and 19. Brackets 36 do not normally touch the guide rails and are operative to prevent excessive lateral loads on the columns 11 and 12 which might occur as a result of the sudden failure of an eccentrically located test specimen.

Loading unit 14 can be mounted on either base member 21 or crosshead 13 but is illustrated as mounted on the crosshead. The loading unit comprises a cylinder 38 having an adapter plate 39 at its upper end which is mounted on and supported by four evenly spaced load cells 40 suitably supported on the crosshead 13. A double acting piston 41 is received in the cylinder and has a downwardly extending piston rod 42 connected to the upper gripper 15, and a balancing rod 43 that extends upwardly out of the cylinder chamber and balances the effective piston area so that a given pressure produces the same force when acting on either face of the piston.

The other gripper is fixed and is mounted on base member 21. The grippers 15 and 16 are preferably of a hydraulically operated type such as a modification of the type shown in Patent 2,908,163, McClelland. Grippers 15 and 16 are adapted to grip the test specimen 17 and transmit the test load thereto, which load is applied by a pressurized fluid in the cylinder 38 acting against piston 41.

Each load column is supported in an identical manner so that only one need be described in detail. Load columns 11 and 12 extend through base member 21 and yoke member 20, there being suitable bores or apertures provided in such members which contain a bearing 45 that slidably engages the associated columns. Base member 21 also includes a downwardly facing ring 46 which surrounds the aperture and presents a downwardly facing shoulder that extends transversely of the column. Similarly, yoke member 20 includes a pair of rings 47 secured to the upper surface thereof and presenting upwardly facing shoulders that extend transversely of and concentric to the columns.

The ends of columns 11 and 12 extend downwardly and upwardly beyond rings 46 and 47 and are connected to a plurality of end plate assemblies 48 hereafter referred to simply as "end plates." The end plates comprise an outer annular collar 49 which receives an inner split collar 50 having a tapered bore that engages a tapered shoulder formed on the end of the associated column as best seen in FIG. 3. The lower end plates engage rings 46 whereas the upper end plates 48 abut a plurality of shims 51 interposed between the upper end plates and rings 47. The shims are bolted to collar 49 to retain them in place.

When the test specimen 17 is to be tested in tension, pressurized fluid is supplied to the lower portion of cylinder 38 and acts against the lower face of piston 41 to force it upwardly and thereby place the specimen in tension. Such action develops a reaction force in the cylinder which is transmitted through the load cells 40 and crosshead 13 to load columns 11 and 12. With reference to FIG. 7, when the specimen is in tension, crosshead 13 pulls downwardly on load columns 11 and 12 and thereby increases the tension in upper portions $a$ and $b$ of load columns 11 and 12 and, as will be pointed out hereafter, reduces the tension in the lower portions $c$ and $d$ of the load columns. In the absence of any corrective measures, a high test load would cause the upper portions of the load columns to elongate, within the elastic limits of the material, and thereby move lower end plates 48 away from the under surface rings 46 of base member 21. Under such circumstances, should the test specimen rupture, the lower end plates could snap back against the under surface and thereby cause damage. However, means are provided for preventing such damage, the particular means being shims 51 which preload columns 11 and 12 in tension with forces greater than that to which the columns are subjected because of the application of the test load so that the end plates cannot move away from the plane.

The preloading is accomplished during the assembly of the testing machine. One way to do this would be to erect the machines without any shims and any preloading of columns 11 and 12. Then, by placing a test specimen in the grippers and actuating the loading unit 14 to place the test specimen in compression, the columns can be stretched causing the upper end plates to move away from yoke member 20. Then, shims 51 can be assembled so that when the preloading load is subsequently released, the columns are preloaded to the desired extent.

Again, with reference to FIG. 7, when columns 11 and 12 are preloaded and placed in tension, the support frame 10 is compressed between the end plates. When a test specimen is compressed, the tension in the lower portions of the column increases but the tension in the upper portions of the columns decreases. When a test specimen is tested in tension, the tension in the upper portions of the columns increases whereas that in the lower portions of the column decreases. Obviously, because the end plates are free to move away from the frame, neither of the columns nor any section thereof will be placed in compression.

Another way to prevent damage to the machine is shown in FIGS. 6, 8 and 9. Here, each end of each column is bolted directly to a circular end plate 53 provided with a plurality of cylinders 54 which receive pistons 55 that abut the adjacent portion of the support frame. The cylinders are connected to a source of pressurized liquid 56 through a check valve 58 and a throttle valve 59 as illustrated in FIG. 6. The source is pressurized slightly, here schematically shown merely as the liquid head, so that as the end plate 53 moves away from the support frame, liquid flows into the cylinders. Then, a sudden rupture, which would tend to cause the end plate to suddenly snap against the frame, forces the liquid out of the cylinders and through the throttle valve which restricts the flow and thereby dampens the motion to a safe level.

As shown in FIG. 8, when a test specimen is compressed, the lower portions $c$ and $d$ of the columns are stressed in tension whereby the upper end plates 53 move away from the frame. As illustrated in FIG. 9 when a specimen is tested in tension, the upper portions $a$ and $b$ of the columns elongate whereby the lower end plates 53 move away from the plane. Whenever the end plates return towards the frame, such motion is limited due to the hydraulic dampening, in the manner described above.

The advantages to be derived from the invention include the following: first, since the load columns are always stressed in tension and never in compression, they do not have to be dimensioned to withstand buckling. Hence, the columns can be made considerably smaller in diameter while the rated test load of the machine is the same for both tension and compression tests. Second, the test load always tends to straighten the columns, hence, minor mill imperfections as well as straightness requirements, need not be as critical as with conventional design. Third, the test specimen is held in the same place for both tension and compression tests. This is desirable because it eliminates the need for any additional grippers and shifting of the machine to perform successively a tension test and a compression test, and it permits a single test specimen to be subjected, statically or cyclically, to both tensile and compressive forces.

It will be obvious to those skilled in the art, that many changes can be made in the details and arrangements of parts without departing from the scope of the invention as defined in the appended claims.

What is claimed is:

1. In a materials testing machine, the combination of:
a support frame comprising a base, a yoke above said base and a side frame between said base and said yoke;
a pair of vertically spaced test specimen grippers adapted to support a test specimen for the application thereto of tensile and compressive forces;
a loading unit connected to one of said grippers and operative to apply a test load thereto;
a pair of parallel, upright load columns that extend through aligned apertures in said yoke and said base and are slidable relative thereto;
said yoke and said base including a plurality of transverse shoulders each surrounding each aperture and facing away from said frame;
said columns having ends that extend outwardly from said frame and beyond said shoulders;
means connecting one of said grippers to said frame and the other of said grippers to said loading columns;
a plurality of end plates respectively connected to the ends of said columns and engaging said shoulders to restrain movement of said ends towards said frame; and
dampening means operative to prevent sudden movement of said end plates against said shoulders.

2. In a materials testing machine, the combination of:
a support frame comprising a base, a yoke above said base and a side frame between said base and said yoke;
a pair of vertically spaced test specimen grippers adapted to support a test specimen for the application thereto of tensile and compressive forces;
a loading unit connected to one of said grippers and operative to apply a test load thereto;
a pair of parallel, upright load columns that extend through aligned apertures in said yoke and said base and are slidable relative thereto;
said yoke and said base including a plurality of transverse shoulders each surrounding each aperture and facing away from said frame;
said columns having ends that extend outwardly from said frame and beyond said shoulders;
means connecting one of said grippers to said frame and the other of said grippers to said loading columns;
a plurality of end plates respectively connected to the ends of said columns for engaging said shoulders to restrain movement of said ends towards said frame; and means interconnected between the end plates on one end of said columns and the shoulders adjacent thereto and operative to preload said columns so that all of said end plates remain fixed with respect to said frame under the expected test loads.

3. In a materials testing machine, the combination of:
a support frame;
a pair of test specimen grippers;
a loading unit supporting one of said grippers;
a pair of upright load columns extending through apertures in said frame;
a crosshead connected to said columns;
said other gripper and said loading unit having mounting means whereby one is mounted on said crosshead and the other on said frame;
at one end of each column, means on the frame engaging means on the column and confining the column end against axial movement in a direction towards the opposite end of the column; and
at each of said opposite column ends means on the frame engaging means on the column and restraining the column end against axial movement towards said one end and preloading the column in tension to provide that the end remains substantially fixed against axial movement in a direction away from said one end under the expected test loads.

References Cited by the Examiner

UNITED STATES PATENTS 2,999,382  9/61  McClelland _____ 73—93

RICHARD C. QUEISSER, *Primary Examiner.*